(12) United States Patent
Manthe et al.

(10) Patent No.: US 10,226,832 B2
(45) Date of Patent: Mar. 12, 2019

(54) METAL WORKING POWER SUPPLY CONVERTER SYSTEM AND METHOD

(71) Applicant: ILLINOIS TOOL WORKS INC., Glenview, IL (US)

(72) Inventors: Alan A. Manthe, Hortonville, WI (US); Jason Alan Dunahoo, Menasha, WI (US); Craig Steven Knoener, Appleton, WI (US); Mary Divya Poulose, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/412,620

(22) Filed: Jan. 23, 2017

(65) Prior Publication Data

US 2017/0129034 A1 May 11, 2017

Related U.S. Application Data

(63) Continuation of application No. 13/925,579, filed on Jun. 24, 2013.

(51) Int. Cl.
*H02J 1/10* (2006.01)
*B23K 9/09* (2006.01)
(Continued)

(52) U.S. Cl.
CPC ............ *B23K 9/093* (2013.01); *B23K 9/1043* (2013.01); *H02M 1/08* (2013.01); *H02M 3/285* (2013.01); *H02M 3/33523* (2013.01)

(58) Field of Classification Search
CPC .......... B23K 9/09; B23K 9/091; B23K 9/092; B23K 9/093; B23K 9/0956; B23K 9/1006;
(Continued)

(56) References Cited

U.S. PATENT DOCUMENTS 3,689,737 A 9/1972 Eckles
4,359,622 A 11/1982 Dostoomian
(Continued)

FOREIGN PATENT DOCUMENTS

CN 1762087 4/2006
DE 4023253 1/1992
(Continued)

OTHER PUBLICATIONS

International Search Report from PCT application No. PCT/US2014/036303, dated Jan. 27, 2015, 9 pgs.
(Continued)

*Primary Examiner* — Alex Torres-Rivera
(74) *Attorney, Agent, or Firm* — McAndrews, Held & Malloy, Ltd.

(57) ABSTRACT

A power supply for welding, cutting and similar operations includes a dual two-switch forward converter. The converter has two inverter circuits coupled in parallel but controlled to provide output power in an interleaved fashion. To avoid "walking" of the circuits (which could result in different duty cycles and imbalance of the load sharing), control signals are determined and applied to a first of the inverter circuits, and "on" times of the first circuit is monitored, such as by augmenting a counter to determine the number of clock cycles the first circuit is "on". The same duration is then used for commanding output from the second inverter circuit. The duty cycles of both circuits is thus ensured to be the same regardless of changes in the total output power.

22 Claims, 6 Drawing Sheets

(51) Int. Cl.
*H02M 3/28* (2006.01)
*B23K 9/10* (2006.01)
*H02M 1/08* (2006.01)
*H02M 3/335* (2006.01)

(58) Field of Classification Search
CPC .. B23K 9/1012; B23K 9/1056; B23K 9/1062; B23K 10/00; H02M 3/22; H02M 3/28
USPC .... 363/15, 16, 17, 65, 71, 97, 98, 131, 132; 323/272; 219/130.21
See application file for complete search history.

(56) References Cited

U.S. PATENT DOCUMENTS

| | | | |
|---|---|---|---|
| 4,438,317 A | 3/1984 | Ueguri |
| 4,521,671 A | 6/1985 | Fronius |
| 4,544,826 A | 10/1985 | Nakanishi |
| 4,564,742 A | 1/1986 | Karlsson |
| 4,749,935 A | 6/1988 | Osborne |
| 4,866,247 A | 9/1989 | Parks |
| 4,947,021 A | 8/1990 | Stava |
| 5,278,390 A | 1/1994 | Blankenship |
| 5,319,533 A | 6/1994 | Reynolds |
| 5,357,078 A | 10/1994 | Smith |
| 5,406,051 A | 4/1995 | Lai |
| 5,591,355 A | 1/1997 | Ishikawa |
| 5,824,990 A | 10/1998 | Geissler |
| 5,864,116 A | 1/1999 | Baker |
| 5,930,122 A | 7/1999 | Moriguchi |
| 5,991,169 A | 11/1999 | Kooken |
| 6,111,216 A | 8/2000 | Stava |
| 6,160,241 A | 12/2000 | Stava |
| 6,172,888 B1 | 1/2001 | Jochi |
| 6,225,598 B1 | 5/2001 | Nihei |
| 6,321,139 B1 | 11/2001 | Terada |
| 6,359,258 B1 | 3/2002 | Blankenship |
| 6,596,970 B2 | 7/2003 | Blankenship |
| 6,649,869 B2 | 11/2003 | Reynolds |
| 6,710,297 B1 | 3/2004 | Artelsmair |
| 6,717,108 B2 | 4/2004 | Hsu |
| 7,315,155 B2 | 1/2008 | Takeuchi |
| 8,049,140 B2 | 11/2011 | Kawamoto |
| 8,199,536 B2 | 6/2012 | Mangraviti |
| 8,278,882 B2 | 10/2012 | Gotou |
| 8,410,398 B2 | 4/2013 | Daniel |
| 8,455,794 B2 | 6/2013 | Vogel |
| 8,525,077 B2 | 9/2013 | Peters |
| 9,490,792 B2 * | 11/2016 | Zhao ................. H03K 7/08 |
| 9,539,661 B2 * | 1/2017 | Manthe ............. B23K 9/1043 |
| 9,584,024 B2 * | 2/2017 | Manthe ............. H02M 3/285 |
| 2001/0012207 A1 | 8/2001 | Nomura |
| 2006/0054610 A1 | 3/2006 | Morimoto |
| 2006/0175313 A1 | 8/2006 | Kooken |
| 2006/0213890 A1 | 9/2006 | Kooken |
| 2006/0243716 A1 | 11/2006 | Stava |
| 2007/0181547 A1 | 8/2007 | Vogel |
| 2008/0078812 A1 | 4/2008 | Peters |
| 2009/0230941 A1 | 9/2009 | Vogel |
| 2011/0108536 A1 | 5/2011 | Inada |
| 2012/0000895 A1 | 1/2012 | Sato |
| 2013/0194852 A1 * | 8/2013 | Nakano ............. H02M 7/53875 363/131 |
| 2014/0021180 A1 | 1/2014 | Vogel |
| 2014/0374398 A1 | 12/2014 | Manthe |

FOREIGN PATENT DOCUMENTS

| | | |
|---|---|---|
| EP | 0970775 | 1/2000 |
| EP | 1138429 | 10/2001 |
| EP | 1710897 | 10/2006 |
| FR | 2850463 | 7/2004 |
| GB | 2393338 | 3/2004 |
| JP | S61273260 | 12/1986 |
| JP | 2001276971 | 10/2001 |
| WO | 2008140398 | 1/2008 |

OTHER PUBLICATIONS

International Search Report from PCT application No. PCT/US2014/036895, dated Mar. 4, 2015, 10 pgs.

* cited by examiner

METAL WORKING POWER SUPPLY CONVERTER SYSTEM AND METHOD

CROSS REFERENCE TO RELATED APPLICATIONS

This application is a Continuation Patent Application of U.S. Non-Provisional application Ser. No. 13/925,579, entitled "Metal Working Power Supply Converter System and Method", filed Jun. 24, 2013, which is herein incorporated by reference in its entirety for all purposes.

BACKGROUND

The invention relates generally to a field of welding systems and systems for performing metal working operations, such as gas metal arc welding (GMAW). More particular, the disclosure relates to innovations in the control of power supplies and converter circuitry used in such systems.

Many applications exist for welding and cutting systems used to join two or more workpieces to one another, or to cut workpieces. These applications exist throughout industry, but also for construction, ship building, maintenance, and so forth. In arc welding systems, electrical power is converted to a form useful for a welding process, and the power provides voltage and current necessary to establish and maintain arcs between an electrode and a workpiece. Plasma cutting and similar operations also require conditioned power adapted for the specific process. In gas metal arc welding (GMAW), the arc is established between an electrode that is advanced towards the workpiece and of the workpiece itself. The electrode is consumed insomuch as it is added to the weld as the weld puddle advances during the operation.

In welding and cutting power supplies, power electronic circuitry is commonly switched on and off to control the desired power output used for the process. The switching is commonly performed by pulse width modulation (PWM) signals applied to the gates of power electronic switches of converter circuits within the supplies. Conventional systems utilize a single inverter in this converter circuitry, along with an inductor to smooth the output waveform. However, inductors in such systems can be quite large, implying additional cost and weight. Improvements in these systems have included the use of two or more inverters or converters which are switched to provide the desired output. The ripple amplitude of the output current is thereby reduced, consequently reducing the size of the output inductor.

One problem in such systems exists insomuch as independently controlled inverter circuits can become unbalanced during operation. The result can be a "walking" deviation in the duty cycles of the two inverters, in which one of the inverters will tend to progressively take on most of the load, causing thermal imbalance, undermining the benefits obtained by the use of multiple inverters. Moreover, current systems may not account for the magnetic dynamics of transformer circuits in the power converters. With common assumptions as to magnetizing and demagnetizing of the transformers, less than the full potential power output is obtained when a PWM duty cycle of 50% is treated as a limit for each of the unipolar or single ended inverter circuits.

Improvements are therefore needed in the field that would allow for avoiding drawbacks such as those described above.

BRIEF DESCRIPTION

The present disclosure sets forth certain solutions that may be implemented in welding and similar power supplies and that are designed to respond to such needs. In accordance with certain aspects of the present disclosure, a welding or cutting power supply system includes a converter circuit comprising first and second solid state switching circuits each having two power electronic switches for producing output power at a controllable level suitable for a welding or cutting operation, the first and second solid state switching circuits being electrically coupled in to provide combined output. An output inductance is coupled to outputs of both the first and second solid state switching circuits. Control circuitry is coupled to the first and second solid state switching circuits and configured to provide PWM control signals for controlling states of the power electronic switches of the switching circuits to maintain desired loading of the switching circuits independent of the level of the output power. For each cycle of the switching circuits the control circuitry is configured to apply PWM control signals to the first switching circuit based upon a desired duty cycle, to determine the duration of the PWM control signals applied to the first switching circuit, and to apply PWM control signals to the second converter based upon the determined duration without re-determining the duty cycle for the second switching circuit.

In accordance with other aspects, a welding or cutting system comprises a power supply comprising first and second solid state switching circuits each having two power electronic switches for producing output power at a controllable level suitable for a welding or cutting operation, the first and second solid state switching circuits being electrically coupled in parallel, and an output inductor coupled to outputs of both the first and second solid state switching circuits. Control circuitry is coupled to the first and second solid state switching circuits and configured to determine PWM control signals for the first switching circuit based upon a desired duty cycle, to determine the duration of the PWM control signals of the first switching circuit, and to determine PWM control signals to the second converter based upon the determined duration without re-determining the duty cycle for the second switching circuit.

In accordance with still further aspects, a welding or cutting method, comprises applying PWM control signals to a first switching circuit of a power converter comprising at least two switching circuits operated in an interleaved switching pattern, the control signals of the first switching circuit being based upon a desired duty cycle to produce a welding or cutting output, and determining a duration of the PWM control signals applied to the first switching circuit. PWM control signals are then applied to a second switching circuit of the power converter for a duration based upon the determined PWM duration.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
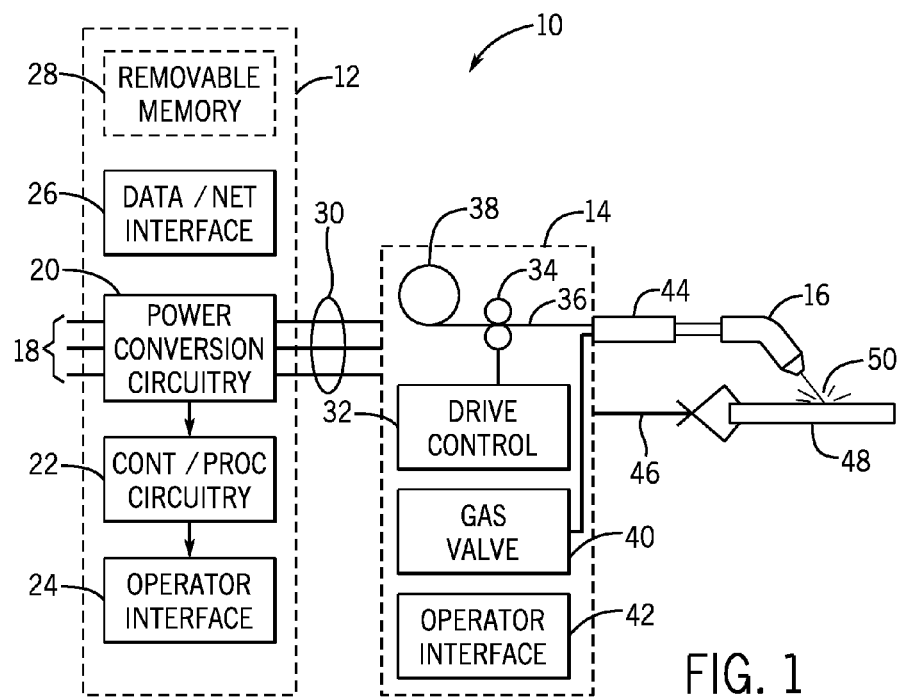
FIG. 1 is a diagrammatical representation of an exemplary GMAW welding system incorporating power conversion circuitry in accordance with the present disclosure.

FIG. 1 illustrates an exemplary welding system 10 in the form of a GMAW system, and in particular a MIG welding system. In this exemplary system a power supply 12 receives and converts power that is applied to a wire feeder 14. The wire feeder delivers the power to a welding torch 16 for completing a welding operation. Although the present disclosure used this GMAW power supply as an exemplary basis for presentation of the new circuitry and control techniques, it should be understood that the same teachings may be applied to power supplies used for other welding processes, as well as for other metal working processes, such as plasma cutting.

The power supply 12 receives input power 18 from any suitable source, such as the power grid, an engine generator set, hybrid power supplies, fuel cells, batteries, or a combination of these. Power conversion circuitry 20 converts the power to a form suitable for a welding (or other metal working) process. The power supply may be designed to carry out multiple different welding processes that can be selected by an operator, and the power conversion circuitry includes components, such as solid state switches discussed below, that allow for power conversion in accordance with the desired process. Control and processing circuitry 22 is coupled to the power conversion circuitry 20 and controls the operation of the power conversion circuitry during the selected process. For example, the control and processing circuitry 22 may provide signals that regulate the conductive states of solid state switches within the power conversion circuitry to produce the desired output power, as also discussed below. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control and processing circuitry 22. The power supply may further include circuitry that allows for communications with remote or networked components and systems, illustrated as data/network interface 26 in FIG. 1. Such circuitry may allow for monitoring of welding operations, logging of weld data, downloading or configuration of new processes and updates to processes, and so forth. Finally, the power supply will sometimes include removable memory 28 that may be used for storing processes, process parameters, system updates, and any suitable data.

Power and data may be transferred from the power supply 12 to the wire feeder 14 via one or more cables or cable bundles 30. The wire feeder itself comprises a drive control circuitry 32 that regulates the operation of a drive assembly 34. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply and wire feeder may operate in coordination so that wire and gas resources are fed to the welding operation when power is provided for welding at the initiative of the welding operator (e.g., via a control on the torch). In some embodiments the power supply and wire feeder may be integrated into a single package. The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

Figure 2:
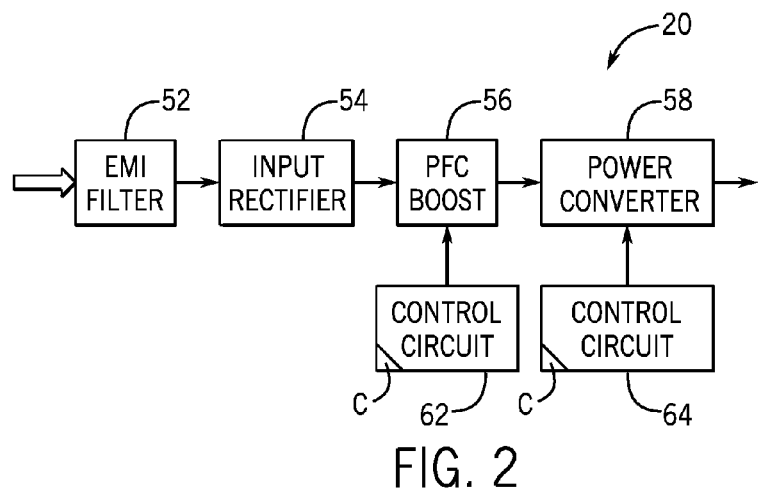
FIG. 2 is a diagrammatical representation of exemplary components of the power conversion circuitry.

FIG. 2 illustrates exemplary functional components for the power conversion circuitry 20. As shown in FIG. 2, this circuitry may include an electromagnetic interference filter 52. Such circuitry will typically provide an inductive-capacitive filter, and may include protective devices such as varistors. An input rectifier 54 converts AC power to DC power, and will typically include a full bridge rectifier. The DC power is placed on a DC bus, and the circuitry may include bus capacitors to smooth the ripple of the DC waveform on the DC bus. A power factor correction boost circuit 56 may allow for power factor correction with the input power. Some systems may not include this boost circuit. Where provided, this may be a switched circuit that steps up the DC bus voltage to a desired level, such as 440V. An isolated converter 58, which is discussed in greater detail below, includes, in a presently contemplated embodiment, a dual two-switch interleaved forward converter that itself includes an output rectifier and an output inductor. Exemplary electrical components for this circuitry, along with their operation and control are described below. The output of the converter 58 may be provided to the welding (or other) application. In a presently contemplated embodiment, the PFC boost circuitry 56 and the power converter 58 are provided with control circuits 62 and 64 to regulate their operation. Such control circuits will typically serve to provide gate signals to solid state switches within the power converters in accordance with the particular welding (or cutting) regime, the power output needs, and so forth.

Figure 3:
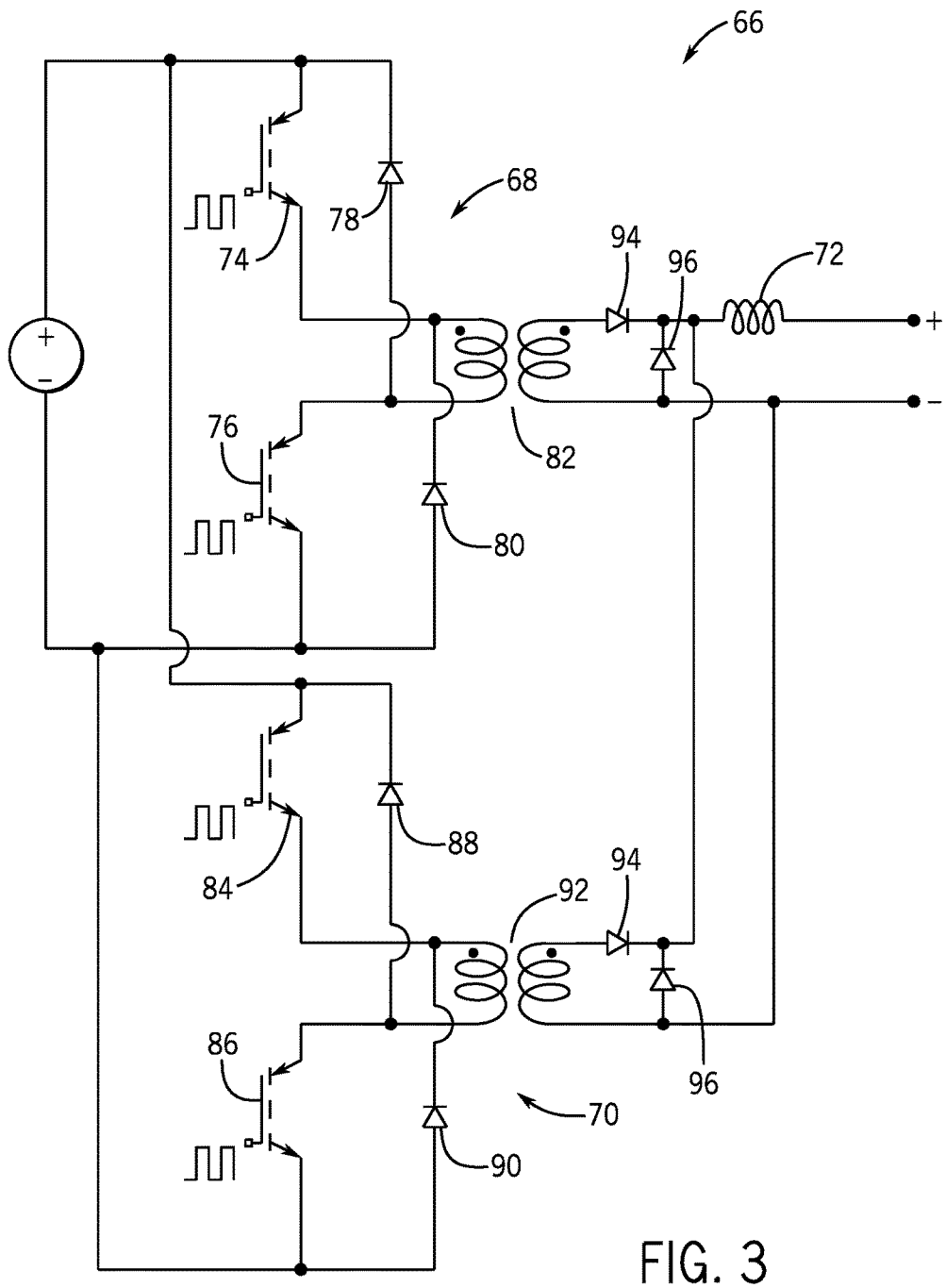
FIG. 3 is an electrical schematic of a currently contemplated dual two-switch power converter utilizing aspects of the present disclosure.

FIG. 3 illustrates an exemplary interleaved forward converter of the type mentioned above. The forward converter 66 in this embodiment is a dual two-switch interleaved forward converter that comprises first and second inverter circuits 68 and 70 coupled generally in parallel but controlled in an interleaved fashion. The outputs of the two circuits are joined as illustrated, with an output inductor 72 common to both circuits to smooth the output waveform. It should be noted that in some systems, particularly in welding systems, a welding cable may provide sufficient parasitic inductance such that the separate inductor may not be required, particularly where the frequency of the output waveform is sufficiently high. More particularly, the first inverter circuit 68 comprises two solid state switches 74 and 76, which may typically be insulated gate bipolar transistors with freewheel diodes 78 and 80, respectively. Application of pulsed control signals to the gates of these devices allows for creation of an output waveform that is applied to a transformer 82. Analogous components are provided in the second inverter circuit 70 in the form of switches 84 and 86, diodes 88 and 90, and transformer 92. Each inverter circuit includes diodes 94 and 96 which form an output rectifying circuit, that serve as rectifying and freewheeling functions, respectively.

In operation, the two inverters are controlled by pulse width modulated signals that cause the circuits to alternatively produce output that is effectively summed. To ensure that both circuits produce equal output, and that the load is shared, the current control scheme effectively generates and provides pulse width modulated gate drive signals to a first of the inverter circuits, monitors the duration of the "on" state of the first circuit (the period during which the circuit is controlled to produce output power), then pulses the second inverter circuit "on" for a similar period to ensure the same duty cycle.

Figure 4:
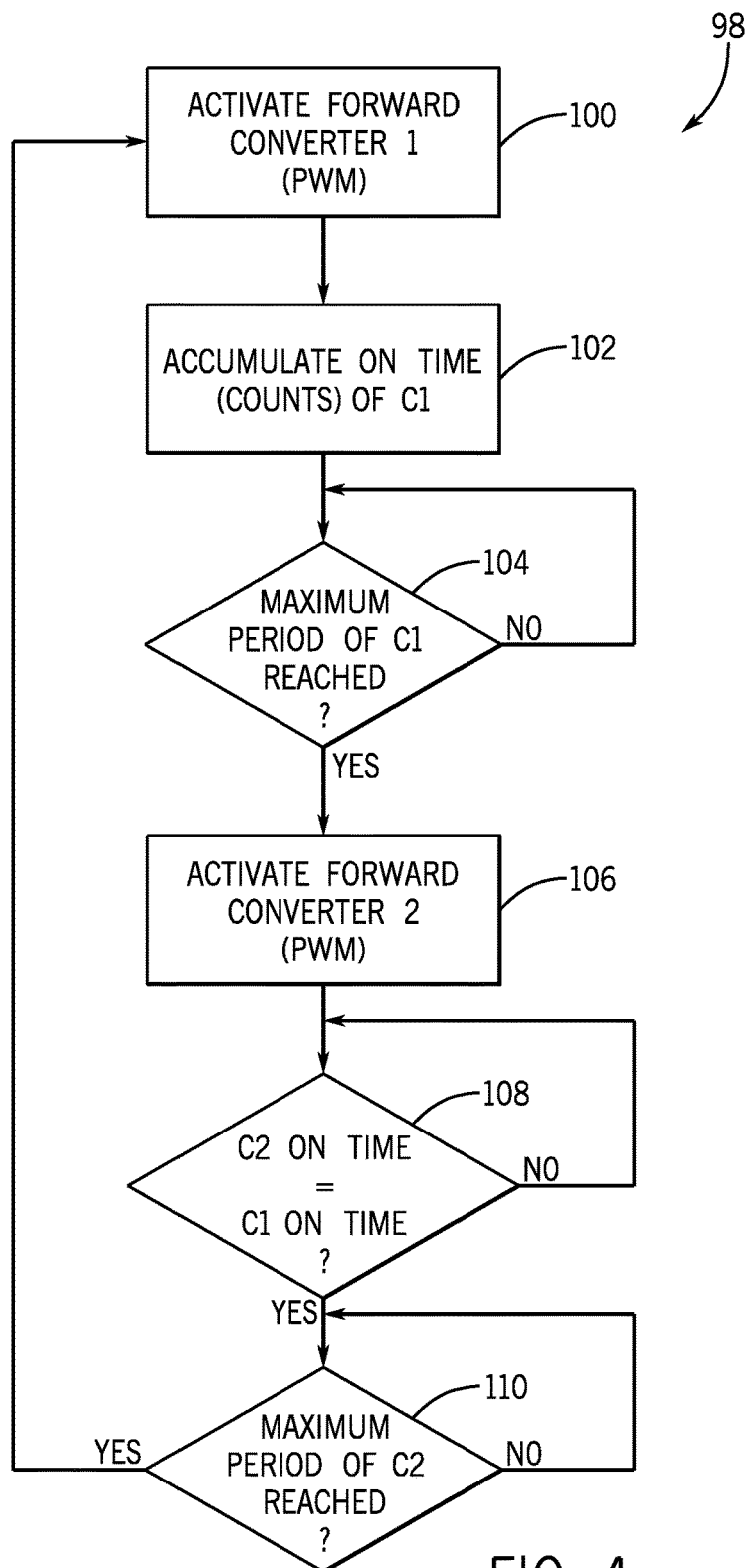
FIG. 4 is a flow chart illustrating exemplary logic for providing control signals to the two converters of the circuit of FIG. 3.
Figure 5:
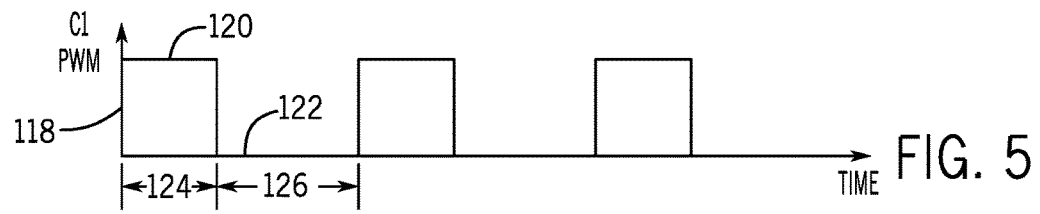
FIGS. 5-10 are graphical representations of exemplary control and output waveforms exemplifying the control of the two converters in accordance with the present techniques.
Figure 6:
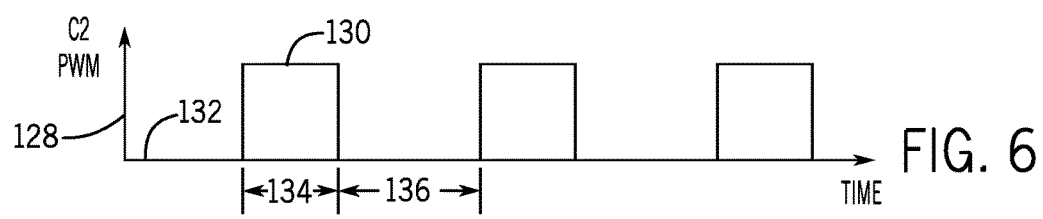
Figure 7:
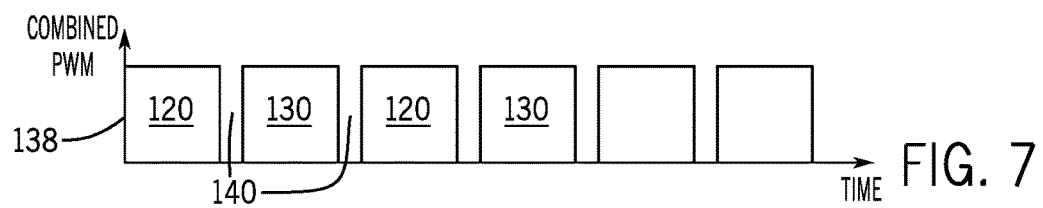

This process is summarized generally in FIG. 4. The control logic 98 may be represented as beginning with activation of forward converter one (corresponding to inverter circuit 68 in FIG. 3) as indicated at step 100. The first forward converter is activated to provide an output for a desired period, depending upon the needs of the welding (or other) operation. In this basic control scenario, each forward converter is allowed to be placed in an "on" output state for one half of the time. Thus, as indicated at step 102, the "on" period of the first converter is monitored or accumulated, such as by augmenting a counter for clock cycles during which the first converter is "on". Other techniques may certainly be employed for this purpose, including other methods of measuring time, storing durations of gate drive signals, and so forth. As indicated at step 104, it is then determined whether the maximum allowed period for activation of the first converter has been reached. In many embodiments, this period may be equal to a 50% duty cycle or less, although periods of greater than 50% may be used, as discussed below. Once the maximum period for activation of the first converter is reached, then, the second forward converter is activated as indicated at step 106. The second forward converter is activated (e.g., gate drive signals are provided to the solid state switches) for a period equal to that during which the first forward converter was "on". The query block 108 in FIG. 4 illustrates that the activation of the second forward converter continues until the period is equal (e.g., the same number of clock cycles counted for the first converter has expired for the second). At step 110 it is determined whether the maximum activation time for the second converter is reached. Once the results of both blocks 108 and 110 are affirmative, the second forward converter is deactivated and the first forward converter may be reactivated FIGS. 5-10 are graphical illustrations of PWM control signals that may be applied to the switches of each of the converters 68 and 70, as well as output waveforms for currents of each. As illustrated in FIG. 5, control signals 118 for the first converter 68 are applied in pulses that may approach a 50% duty cycle. (As described with respect to FIGS. 11-14, this duty cycle, may, in fact, exceed 50%.) Thus, "on" periods 120 are those in which the solid state switches 74 and 76 receive gate drive signals to place them in a conductive state (alternatively) and "off" periods 122 are periods during which the signals to the switches maintain them in a non-conductive state. The ratio of the "on" time to the "off" time, designated by reference numerals 124 and 126, respectively, corresponds to the duty cycle of the first converter 68. Similarly, as depicted in FIG. 6, PWM control signals to the second converter, designated generally by reference numeral 128, include "on" periods 130 and "off" periods 132 in which the switches 84 and 86 (alternatively) are placed in conductive and non-conductive states, respectively. Here again, as will be appreciated by those skilled in the art, due to the inverter circuitry design the inverter switches are typically switched alternatively. The resulting "on" time 134 and "off" time 136 provide the duty cycle for the second converter 170. Ideally, these duty cycles will be identical. When combined, then, as illustrated in FIG. 7, the interleaved switching of converters 168 and 170 produce a combined duty cycle with "off" periods 140 between the alternating outputs provided by the respective converters.

In the present embodiment, as described with respect to FIG. 4, each of the converters is available to be placed in a conductive state to provide output power at a specific point in time. Thus, the "on" state 120 in FIG. 5 for the first converter begins at the left axis in that figure, and the next available point of initiation for placing the first converter in a "on" state begins at the period resulting from the sum of periods 124 and 126 (i.e., the switching period). The second converter similarly is available to be placed in an "on" state at a specific time that is 180° displaced from that of the first converter (i.e., at a point at one half of the switching period). That is, given the total period (period 124+126), which is equal for both converters, the second converter is available to be switched into the "on" or output state at a time half way through the total switching period.

Figure 8:
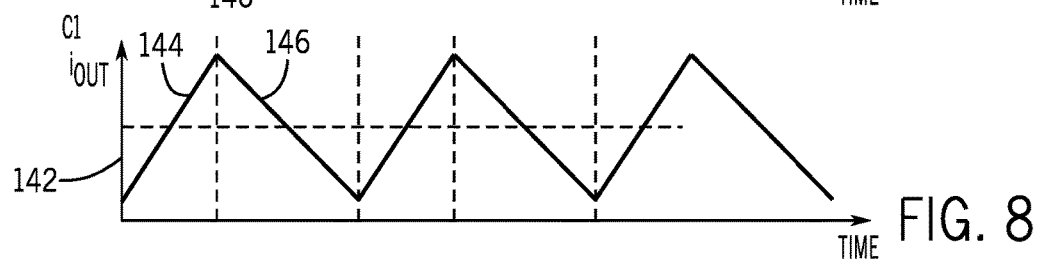
Figure 9:
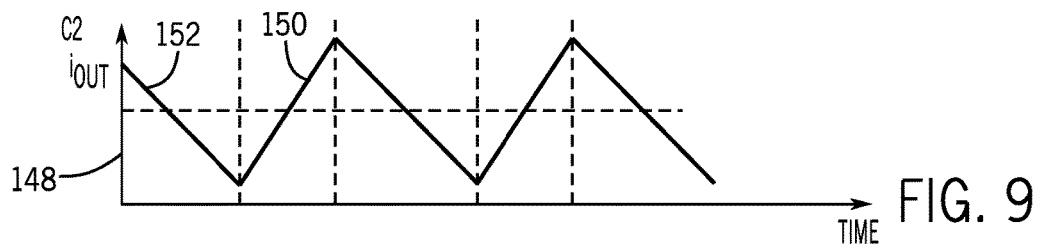
Figure 10:
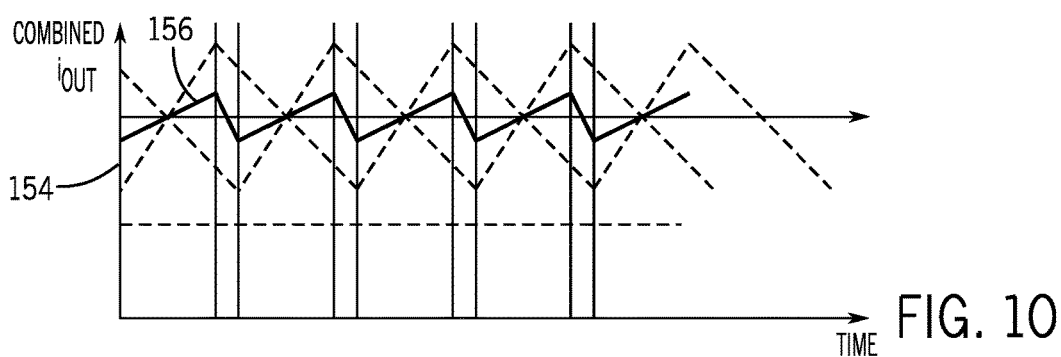

FIG. 8 illustrates the output of the first converter in a current waveform. As illustrated, the current 142 will rise as indicated by reference numeral 144 so long as the converter is being PWM'ed for output, and will then decline following shut-off of the output of the first converter as indicated by reference numeral 146. The current 148 of the second converter, illustrated in FIG. 9, will similarly rise as indicated by reference numeral 150 when this converter is placed in the "on" or output state, and will decline as indicated by reference numeral 152 when "off". The combined currents, then, illustrated in FIG. 10 and referred generally by reference numeral 154, will be the combination of these waveforms exhibiting a reduced ripple current and generally smoothed output at twice the PWM frequency of either converter, as indicated by trace 156.

As described above, the duty cycles of the two converters are maintained equal during this process. To summarize, control of the first converter is based upon the process selected, the output power parameters desired, and so forth. In this way the desired "on" time and waveform characteristics of the first converter are determined, and PWM control signals are applied to the gates of the solid state switches of the first converter for a desired time. This time, designated by reference numeral 124 in FIG. 5, is counted, such as by augmenting a counter C (as shown in FIG. 2) within the control circuitry logic to count the number of clock cycles (or any other reference cycle) during which the first converter is commanded to provide output. Subsequently, rather than re-determine the required output for the second converter, the second converter PWM control signals are simply applied for an equal time based upon the counter accumulation which is referenced from the immediately preceding control signals applied to the first converter. The two converters are thus ensured with having the same duty cycle regardless of changes in the duty cycle applied to the first converter.

As mentioned above, the present disclosure also provides a mechanism for enhancing the power output of the power converter circuitry described above. In particular, the PWM control signals that command the individual interleaved converters to provide output may be extended beyond the 50% duty cycle range (as discussed below). In conventional systems, it is typically believed that when implementing an inverter topology consisting of a single-ended converter such as a forward converter, the maximum pulse width to the primary of the downstream transformer should not exceed 50%. This traditional treatment is likely the result of the belief that as much time is required to discharge the magnetizing inductance of the transformer as the time required to charge it. Under no-load conditions, this 50% limit generally holds true because the magnetizing inductance charges for the entire time that the primary pulse ("on" period) is applied. However, when the converter is running in constant conduction mode (CCM) and there is load current flowing, there is little or no magnetizing current flowing in the transformer until the current in the leakage inductance matches the reflected load current. Under high load conditions, it may require several microseconds to "charge" the leakage inductance. Also, during this leakage inductance charging time, no secondary voltage is applied to the transformer secondary, which implies that no power is being transformed to the load. This phenomenon may result in an "effective" pulse width where the secondary pulse width is equal to the primary pulse width minus the leakage inductance charge time (which is a function of the load current). When the primary side pulse width is approaching its maximum, say 12.5 microseconds for a 40 KHz forward converter, the secondary pulse width can be substantially less, say on the order of 9 microseconds. This results in an effective pulse width duty of 36% and not 50%. Consequently, if the output voltage is equal to the input voltage times the PWM duty cycle, a limit of the output mean voltage that can be achieved is below the typical 50% limit.

In accordance with the present disclosure, a maximum primary pulse width may be allowed to extend beyond the 50% limit based upon the amount of load current. This extension results from a realization that half of the leakage inductance charge time could be added to the pulse width and would still provide adequate time for the magnetizing inductance to discharge without changing the overall cycle period. By way of example, this could raise the effective secondary pulse width to 43% or an additional 7% load voltage without requiring a change in the turns ratio of the transformer. This technique is generally illustrated in FIGS. 11-14.

Figure 11:
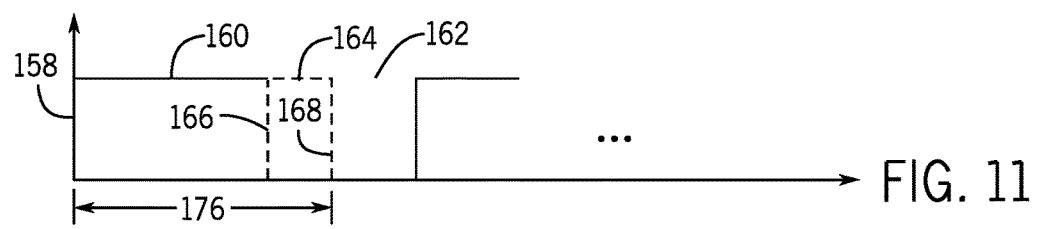
FIGS. 11-14 are graphical representations of switched control signals for more fully utilizing the capabilities of the circuitry.
Figure 12:
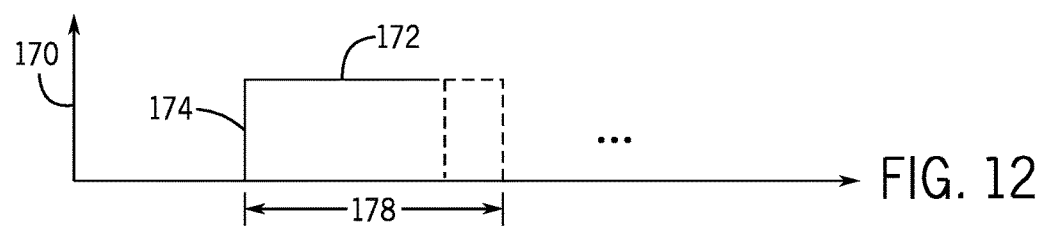

As shown in FIG. 11, the PWM drive signals 158 for the first converter comprise PWM commands 160 that place the converter in an "on" state, followed by periods 162 in which the converter is "off". An extension 164 of the "on" period beyond the normal 50% limit 166 is thus provided to a new switching time 168 at which the converter is switched "off". The PWM control signals 170 for the second converter, illustrated in FIG. 12, may be similarly extended. Thus, PWM control signals to place the converter in a "on" state 172 may begin at the normal time in the overall cycle at which they would have otherwise begun, indicated by reference numeral 174. However, a similar extension in the control may be made that is equal to that made for the first converter. Thus, the "on" period of the first converter, indicated by reference numeral 176 remains equal to that for the second converter, indicated by reference numeral 178. Due to the magnetizing and demagnetizing dynamics of the transformers, a higher mean voltage output is obtained than would be available if the strict 50% duty cycle for each interleaved converter were held.

Figure 13:
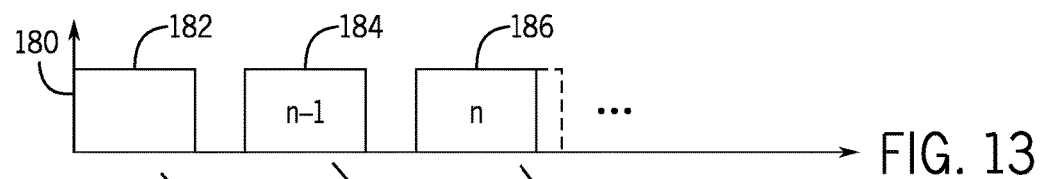
Figure 14:
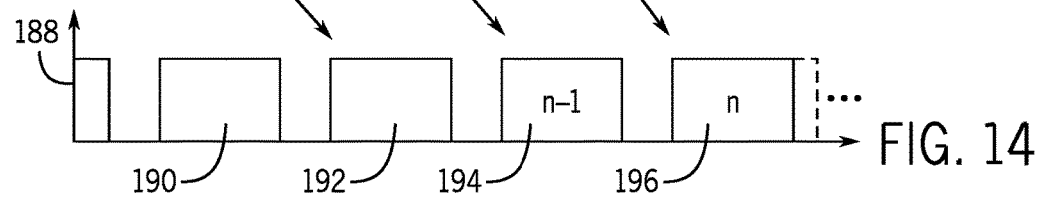

Implementation of the approach may follow the same logic as that described above. That is, the PWM duty cycle of the first converter may be determined based upon the process, power output requirements, and so forth. The actual "on" period for the first converter is then detected and recorded (e.g., by augmenting a counter based upon clock cycles during the "on" period), and a second converter is placed in the "on" state for an equal time.

Where processing capabilities or control logic does not permit such operation (e.g., where it is preferable to determine the full "on" period for the second converter prior to switching it to the "on" state), a delayed approach illustrated in FIGS. 13 and 14 may be adopted. In this approach, the control signals 180 for the first converter will include a series of "on" PWM inputs 182, 184, 186, and so forth. However, the control signals 188 for the second converter may be delayed one cycle to follow the first converter. That is, the control signals 188 for the second converter will include PWM commands 190, 192, 194, 196, and so forth. The delay will result in a one-cycle shift of the PWM command of the first converter in its application to the second converter, as indicated for the "n−1" signals 184 and 194, and the "n" commands 186 and 196 illustrated in both FIGS. 13 and 14. This delay allows the full duration of the "on" period of the second converter to be known before it is applied (in the next switching period).

Figure 15:
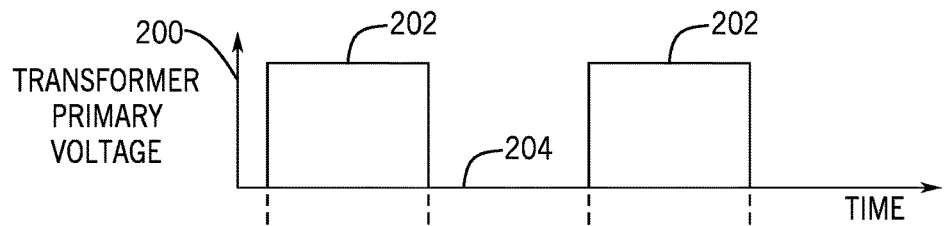
FIGS. 15-19 are graphical representations of exemplary voltage and current waveforms of the type obtainable through use of the control scheme outlined in FIGS. 11-14.
Figure 16:
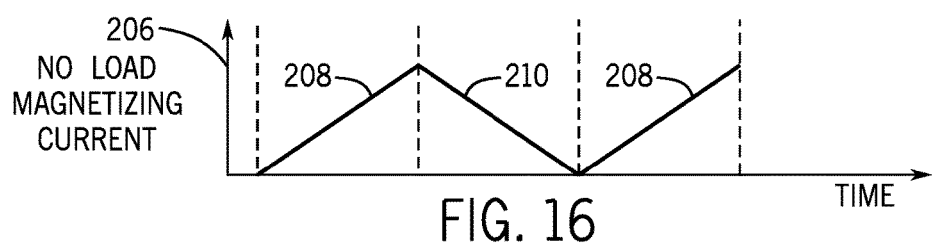
Figure 17:
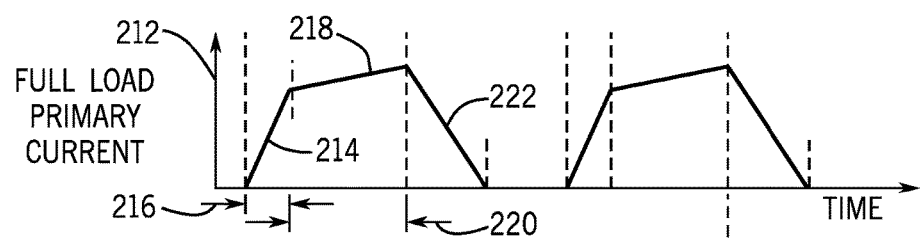

FIGS. 15-19 are graphical representations of exemplary voltage and current waveforms of the type obtainable through use of the control scheme outlined in FIGS. 11-14. In particular, FIG. 15 represents transformer primary control voltages 200 over time. As illustrated, when the converters are switched "on", the voltage rises as indicated by blocks 202, and when "off", the voltage drops as indicated by reference numeral 204. As shown in FIG. 16, then, the no-load magnetizing current 206, then, rises, as indicated by reference numeral 208 when the transformer primary voltage is high, and declines, as indicated by reference numeral 210 when the voltage is low. As shown in FIG. 17, the full load primary current 212 rises, as indicated by reference numeral 214 during an initial period 216. This initial rise corresponds to the leakage inductance current charge only. Then, as indicated by reference numeral 218, the current rises at a lower rate during a period 220, due to the effective secondary voltage and inductance. The decline in the full load primary current, as indicated by reference numeral 222, occurs following removal of the primary voltage.

Figure 18:
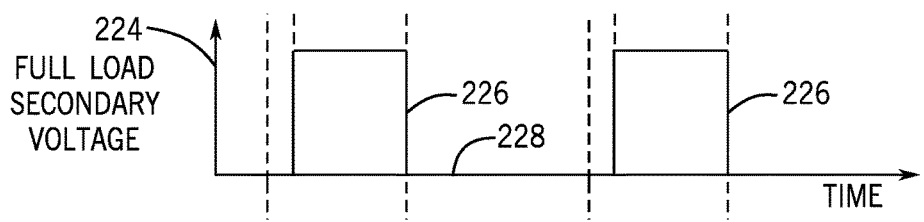
Figure 19:
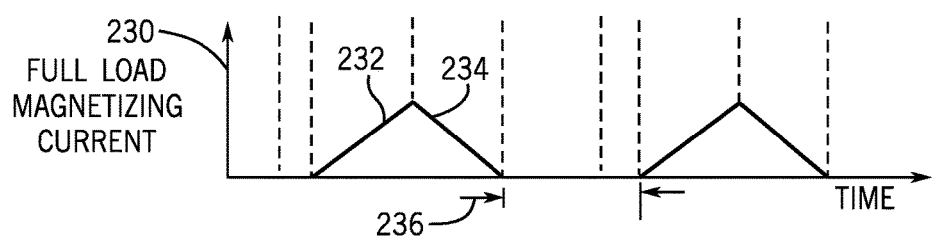

The full load secondary voltage is illustrated in FIG. 18. The voltage is shown as rising, as indicated by reference numerals 226 when the primary voltage is high, but with the "on" level shifted due to the leakage inductance of the transformer. When the primary voltage is removed, the secondary voltage falls, as indicated by reference numeral 228. The full load magnetizing current 230 is illustrated in FIG. 19. Here, the current rises, as indicated by reference numeral 232 when the secondary voltage is high, and declines, as indicated by reference numeral 234 when the secondary voltage is low. An unutilized portion of the pulse width then results, as indicated by reference numeral 236. The techniques described above allow for more full utilization of the pulse width during such periods by extending the command PWM signals beyond the 50% level, as discussed above.

Various modification and variations of the circuitry, systems and techniques described above may be envisaged. For example, while two inverters or converters have been described, the same techniques may be used in systems with more than two such circuits connected to provide common output. Also, while forward converters are illustrated and described, other converter types and applications may be used. Further, while digital, discrete techniques are described for determining switching of the converters, analog and hybrid circuitry may also be employed for this purpose. Finally, while equal time periods for switching of the converters are described, the same or similar techniques may be used for controlling loading (and heating) of the circuits by dissimilar switching periods (e.g., based on adding or subtracting from the counts of clock pulses of a first converter when controlling a second converter).

While in the foregoing discussion and examples two converters were utilized, it should be noted that the extended period control techniques discussed may be used in systems utilizing a single converter as well. While such converters (e.g., single ended converters) have typically been utilized with a 50% duty cycle limit, it has been determined that using the present teachings an extended duty cycle (i.e., not limited to a maximum of 50%) can be obtained. Here again, the present techniques may be used with systems having more than two converters as well.

It should also be noted that the PWM duty cycle implemented will typically be changed during operation of the system, and that the particularly duty cycle at any time may be dependent upon the load, such as the power drawn by the welding or cutting operation in the present context. Such control may be based on monitoring power and/or current drawn by the load. In one presently contemplated embodiment, for example, the PWM duty cycle might be extended by a desired number of clock pulses (or any other desired standard period) for each amp of output current drawn by the load. It may also be based on metering and/or determining a time between a point when the transformer primary current falls to zero and a start of a subsequent switching period, as shown in the foregoing graphical illustrations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding or cutting power supply system, comprising:
   a converter circuit comprising first and second solid state switching circuits each having two power electronic switches for producing output power at a controllable level suitable for a welding or cutting operation, the first and second solid state switching circuits being electrically coupled to provide combined output;
   an output inductance coupled to outputs of both the first and second solid state switching circuits; and
   control circuitry coupled to the first and second solid state switching circuits, the control circuitry configured to:
      provide a first Pulse Width Modulation (PWM) control signal for controlling states of the power electronic switches of the first and second solid state switching circuits to maintain desired loading of the first and second solid state switching circuits independent of a level of the output power, wherein for each cycle of the first and second solid state switching circuits the control circuitry is configured to apply the first PWM control signal to the first solid state switching circuit based upon a desired duty cycle;
      monitor a period during which the first solid state switching circuit is producing output power based on the first PWM control signal;
      determine the period during which the first solid state switching circuit is producing the output power by counting a number of clock cycles during which the first solid state switching circuit is producing the output power; and
      apply a second PWM control signal to the second solid state switching circuit based upon the determined period without re-determining a duty cycle for the second solid state switching circuit.

2. The welding or cutting power supply system of claim 1, wherein the number of clock cycles is counted by augmenting a counter implemented by the control circuitry.

3. The welding or cutting power supply system of claim 1, wherein a duty cycle of each solid state switching circuit is limited to 50% or less.

4. The welding or cutting power supply system of claim 1, wherein a duty cycle of each solid state switching circuit is generally equal.

5. The welding or cutting power supply system of claim 1, wherein at least two solid state switches of each solid state switching circuit are coupled across a common DC bus.

6. The welding or cutting power supply system of claim 5, wherein each solid state switching circuit comprises an output transformer and a freewheeling diode across the common DC bus.

7. The welding or cutting power supply system of claim 1, wherein the first solid state switching circuit comprises a first transformer between a first solid state switch and an output rectifying circuit, and the second solid state switching circuit comprises a second transformer between a second solid state switch and the output rectifying circuit.

8. The welding or cutting power supply system of claim 7, wherein the output rectifying circuit comprises a first and a second rectifier, wherein the first rectifier is between the first solid state switching circuit and a respective transformer and the output inductance.

9. The welding or cutting power supply system of claim 1, wherein the welding or cutting power supply system produces output power suitable for a GMAW welding process.

10. A welding or cutting system, comprising:
    a power supply comprising first and second solid state switching circuits each having two power electronic switches for producing output power at a controllable level suitable for a welding or cutting operation, the first and second solid state switching circuits being electrically coupled in parallel;
    an output inductance coupled to outputs of both the first and second solid state switching circuits; and
    control circuitry coupled to the first and second solid state switching circuits, the control circuitry configured to:
       determine a first Pulse Width Modulation (PWM) control signal for the first solid state switching circuit based upon a desired duty cycle provided to the first solid state switching circuit at a first time;
       monitor a duration of the first PWM control signal;
       determine the duration of the first PWM control signal of the first solid state switching circuit by counting a number of clock cycles that the first PWM control signal is applied to the first solid state switching circuit; and
       determine a second PWM control signal for the second solid state switching circuit at a second time immediately following the first time based upon the determined duration of the first PWM control signal without re-determining a duty cycle for the second solid state switching circuit.

11. The welding or cutting system of claim 10, wherein the number of clock cycles is counted by augmenting a counter implemented by the control circuitry.

12. The welding or cutting system of claim 10, wherein a duty cycle of each solid state switching circuit is limited to 50%.

13. The welding or cutting system of claim 10, wherein a duty cycle of each solid state switching circuit is generally equal.

14. The welding or cutting system of claim 10, wherein at least two solid state switches of each solid state switching circuit are coupled across a common DC bus.

15. The welding or cutting system of claim 14, wherein each solid state switching circuit comprises an output transformer and a freewheeling diode across the common DC bus.

16. The welding or cutting system of claim 10, wherein the first solid state switching circuit comprises a first transformer between a first solid state switch and an output rectifying circuit, and the second solid state switching circuit comprises a second transformer between a second solid state switch and the output rectifying circuit.

17. The welding or cutting system of claim 16, wherein the output rectifying circuit comprises a first and a second rectifier, wherein the first rectifier is between the first solid state switching circuit and the respective transformer and the output inductance.

18. The welding or cutting system of claim 10, wherein the welding or cutting system produces output power suitable for a GMAW welding process.

19. A welding or cutting method, comprising:
applying a first Pulse Width Modulation (PWM) control signal to a first switching circuit of a power converter comprising at least two switching circuits operated in a desired switching pattern, the first PWM control signal of the first switching circuit being based upon a desired duty cycle to produce a welding or cutting output;
monitoring an activation duration of the first switching circuit based on the first PWM control signal;
determining the activation duration of the first switching circuit based on the first PWM control signal by counting a number of clock cycles during which the first PWM control signal is applied; and
applying a second PWM control signal to a second switching circuit of the power converter for a duration based upon the determined activation duration of the first PWM control signal in response to the activation duration reaching a predetermined activation duration.

20. The method of claim 19, comprising switching the switching circuits in an interleaved switching pattern.

21. The method of claim 20, comprising independently transforming and rectifying the outputs of all the switching circuits.

22. The method of claim 19, comprising:
monitoring a second activation duration of the second switching circuit; and
ending application of the second PWM control signal to the second switching circuit in response to the second activation duration reaching the predetermined activation duration.

\* \* \* \* \*